Dec. 1, 1925.
A. WEISS
ATTACHMENT FOR TAXIMETER VEHICLES
Filed Jan. 23, 1923
1,564,038
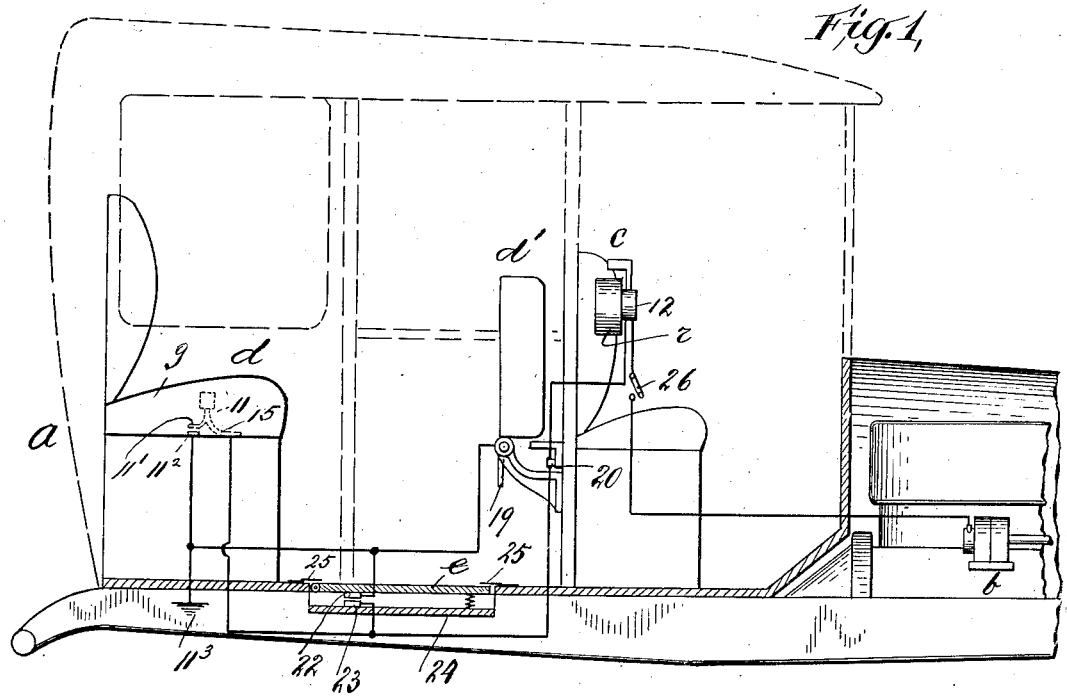
Fig.1,
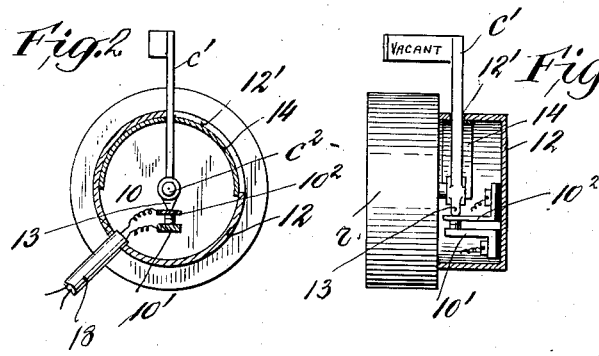
Fig.2,
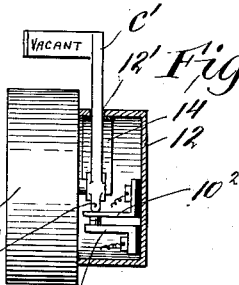
Fig.3,
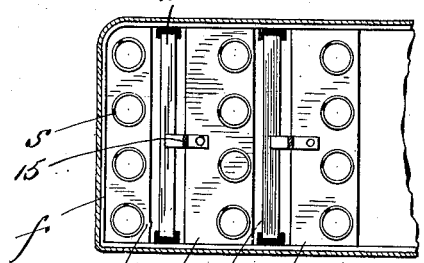
Fig.5,
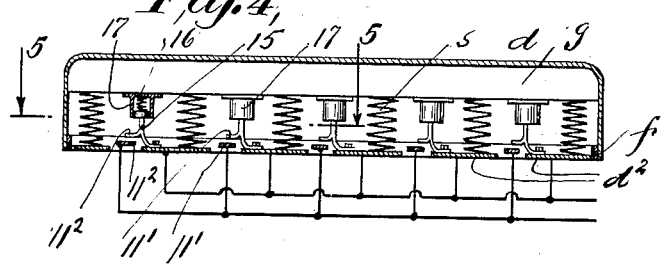
Fig.4,
INVENTOR
Abraham Weiss
BY Max D. Ordmann
ATTORNEY Patented Dec. 1, 1925.

1,564,038

UNITED STATES PATENT OFFICE.

ABRAHAM WEISS, OF NEW YORK, N. Y.

ATTACHMENT FOR TAXIMETER VEHICLES.

Application filed January 23, 1923. Serial No. 614,363.

*To all whom it may concern:*

Be it known that ABRAHAM WEISS, a citizen of the United States, residing at New York, in the county of New York and State of New York, has invented certain new and useful Improvements in Attachments for Taximeter Vehicles, of which the following is a specification.

The present invention relates to attachments for taximeter vehicles. The fare register or clock is generally controlled through a hand lever called the "flag" in such manner that when the latter is raised or in a position indicating "vacant," the registering mechanism of the clock is uncoupled and will not register the fare, but when the flag is lowered, the clock will be in operation while the vehicle is driven.

Unscrupulous drivers instead of charging by the register omit moving the flag but make special rates to the passengers, so that the fare received is a loss to the owner of the vehicle. To obviate such abuses, my present invention has for its object to provide a flag controlling means whereby, when the flag is not moved, the driver will be unable to start the vehicle. The means according to this invention consist of electric switches, one controlled by the flag, another by pressure, as the weight of the passenger, and electric connections leading therethrough from the electric ignition system, such as magneto or battery, to the ground, so that when a passenger enters or seats himself in the car, the electric current of the ignition system will be grounded or short-circuited and remain so as long as the flag is in its "vacant" position.

My invention also consists in the particular construction, combination and arrangement of parts as will be hereinafter more fully described and defined in the appended claims.

In the accompanying drawing, in which similar reference characters denote corresponding parts, Fig. 1 is a diagrammatic view of a vehicle and of the electric connections and switches thereon arranged according to my invention; Fig. 2 is a cross section of the flag switch; Fig. 3 is a longitudinal section thereof; Fig. 4 is an enlarged cross section of a seat equipped with a switch forming part of my device and Fig. 5 is a section on line 5—5 of Fig. 4.

$a$ denotes a taximeter vehicle of usual construction employing for example a high tensioned magneto $b$ to produce ignition. $c$ denotes the usual flag controlled fare register or clock, $d$, $d'$ the seats and $e$ the floor of the car. According to my invention, I provide a switch 10 controlled from the flag handle $c'$ and a switch controlled by pressure, as the weight of the passenger. This latter switch 11 may be arranged where most practicable, and either at one place as for example under the main seat, under the floor or there may be switches at both these places, and additional ones at the back of the main seat and for the auxiliary seats.

When using a magneto, I connect the insulated contact thereof with one contact 10' of the flag switch and the other contact $10^2$ of said flag switch to one contact member 11' of the pressure operated switch 11. The second contact $11^2$ of said latter switch 11 is grounded as at $11^3$ by connecting it to the frame of the vehicle or the like. The contacts 10', $10^2$ of the flag switch 10 are so arranged that normally, that is when the car is unoccupied and the flag is up, or in a position indicating "vacant," the contact members 10', $10^2$ are closed, while the contact members 11', $11^2$ of the switch 11 are open. When a passenger enters or seats himself in the car the contacts 11', $11^2$ will be closed as a result of which the electric circuit of the magneto or of whatever ignition system is used will be grounded preventing the starting of the motor. The driver will therefore be bound to lower or move the flag handle into the position for registering the fare, whereby the contact members 10', $10^2$ will be released opening the circuit, which leads through the switch 11 so that the ignition system will be rendered operative.

The switch 10 controlled by the flag handle $c'$ is adapted to be applied to any suitable place where it can be conveniently controlled from the flag handle. In the present embodiment of my invention, a casing 12 is fixed to the clock $r$ below the flag axle $c^2$. Fixed to and insulated from said casing is a contact block that constitutes the contact member 10' of the flag switch and a spring member that constitutes the second contact member $10^2$ of the switch 10. The axle $c^2$ of the flag handle may be formed at its lower end with an insulated projection or nose 13, arranged so that when the flag is in "vacant" or raised position, it will depress the spring member 10² to be in contact with the block 10' and thus close the switch 10. When the flag is lowered or positioned for registering the fare, the spring member 10² will be released from contact with the block 10' and open the switch 10. The casing 12 shields the switch 10 and is adapted to be so fixed to the clock as to prevent unauthorized removal thereof. In its circumference, a slot 12' is provided serving as a passage for the flag handle. A guard plate 14 may be fixed inside the casing 12 to extend below the slot 12' and prevent access to the switch through the latter.

The switch in the cab or car, as already stated, may be arranged either under the seats or under the floor or both, and may be of any suitable well known construction. In order that the switch for the main seat may be conveniently applied to the latter without requiring a change of construction, I may construct the switch 11 as follows: Between the slats $d^2$, of the frame $f$ supporting the spring $s$ under the cushion $g$ of the seat $d$, are fixed metal strips constituting one set of the contact members 11² heretofore mentioned. On said slats are fixed projections 15, the upper ends of which are disc shaped and movably supported thereon by spiral springs 16 are caps 17, adapted to bear against the bottom of the cushion $g$. The lower ends of these projections are formed with resilient arms projecting over the strips 11² and constituting the second contact member 11'. These projections 15 are suitably insulated from one another and from the members 11² and their resilient arms 11' are adapted normally to be raised from the strips 11². The board or frame $f$ carrying the two sets of contact members, is suitably fixed and sealed to the frame of the seat so that its unauthorized removal will be prevented. When the passenger seats himself, the arms 11' are brought into contact with the members 11².

All wires are adapted to be shielded by enclosing them in tubes 18 of suitable material.

The switch for the tiltable seat $d'$ may for example comprise a contact member 19, suitably attached to the seat and a stationary contact member 20, fixed to the back of the driver's seat. These contact members may be conductively connected to the ignition system and frame of the car through the flag switch in a similar way to the members 11', 11², as indicated diagrammatically in Fig. 1. This switch may be shielded by suitable means, as a casing (not shown).

The electric switch for the floor comprises contact members 22, 23 of which one, say member 22, is applied to a spring actuated tiltable base serving as floor $e$ proper and a fixed base 24, below the latter. Suitably sealed guards 25 may be provided to prevent access to the switches 22, 23.

Between the magneto or electric source and the flag switch, a hand switch 26 may be provided, which normally is adapted to be sealed so as to prevent its operation by the driver. This switch is merely adapted for use in emergency cases.

What I claim is:—

In a taximeter vehicle, the combination with the fare register or clock having a "flag" handle and the electric ignition system having one terminal grounded, of a switch controlled by said "flag" handle, of which one contact point is conductively connected to the insulated terminal of said ignition system, and a switch in the passenger compartment to be automatically controlled by the passenger, one contact point of said automatic switch being conductively connected to said other contact point of said "flag" switch and the other contact point of said passenger switch being grounded.

In testimony whereof I affix my signature.

ABRAHAM WEISS.